United States Patent [19]

North

[11] Patent Number: 4,834,130

[45] Date of Patent: May 30, 1989

[54] MIXING VALVE

[75] Inventor: Royston J. North, Cheltenham, England

[73] Assignee: Caradon Mira Limited, Gloucestershire, England

[21] Appl. No.: 155,549

[22] Filed: Feb. 12, 1988

[30] Foreign Application Priority Data

Feb. 25, 1987 [GB] United Kingdom ............... 8704395

[51] Int. Cl.⁴ ............................................ G05D 11/03
[52] U.S. Cl. .................................... 137/100; 261/64.3; 261/DIG. 76
[58] Field of Search ............... 137/98, 100; 261/64.3, 261/DIG. 32, DIG. 76

[56] References Cited

U.S. PATENT DOCUMENTS

| | | | |
|---|---|---|---|
| 2,335,250 | 11/1943 | Adlam | 261/DIG. 76 |
| 2,483,426 | 10/1949 | Moore | 261/64.3 |
| 2,644,482 | 7/1953 | McCallum | 137/501 |
| 2,903,009 | 9/1959 | Tachhi | 137/100 |
| 3,489,162 | 1/1970 | Meynell | 137/100 |
| 3,566,902 | 3/1971 | Muller | 137/100 |
| 3,582,229 | 6/1971 | Fellenberg | 415/47 |

FOREIGN PATENT DOCUMENTS

| | | |
|---|---|---|
| 356796 | 9/1931 | United Kingdom . |
| 380723 | 9/1932 | United Kingdom . |
| 690570 | 4/1953 | United Kingdom . |
| 808769 | 2/1959 | United Kingdom . |
| 824965 | 12/1959 | United Kingdom . |

*Primary Examiner*—Robert G. Nilson
*Attorney, Agent, or Firm*—Larson and Taylor

[57] ABSTRACT

A steam and water mixing valve having a permanently open fluid connection between a water inlet chamber and a mixing chamber and valve means for controlling the flow of steam from a steam inlet chamber to the mixing chamber wherein the valve means is responsive to pressure differentials between the water inlet chamber and a control chamber each connected to a water inlet whereby the valve means is closed in the absence of water flow or at low pressure differentials.

20 Claims, 3 Drawing Sheets 4,834,130

MIXING VALVE

BACKGROUND OF THE INVENTION

This invention relates to mixing valves and in particular to mixing valves for mixing steam and water.

A typical and common installation where blending of steam with cold water to provide a supply of hot water is used is in the food processing industry where there is a frequent need to wash equipment with hot water at about 80° C.

This is most conveniently done with a hot water hose gun which is supplied with its hot water from a mixing valve. Popular hose guns have a flow on/off trigger for starting and stopping the draw-off of hot water from the mixing valve and means for adjusting the spray pattern.

Previously thermostatic mixing valves have been used to provide the hot water supply to the hose gun. These valves employ a proportioning valve responsive to the hot water temperature for controlling both the steam and the cold water flow so as to maintain the temperature of the hot water substantially constant.

A disadvantage of such valves is that on stopping the water flow they do not completely shut-off the steam flow which can result in the next draw-off of hot water starting with a violent burst of steam which can be dangerous.

A further disadvantage of such valves is that they are generally noisy in operation varying from a deep grumbling to a screeching sound due to mixing of the steam and cold water in a large internal chamber giving rise to a continuous succession of steam implosions. Such steam implosions can also render the mechanism unsuitable making the valve unreliable in operation. Seizure of the mechanism is also a problem.

It is an object of the present invention to provide a mixing valve for mixing steam and water which mitigates at least some of the disadvantages of thermostatic mixing valves above discussed.

SUMMARY OF THE INVENTION

According to the present invention I provide a mixing valve for mixing steam and water comprising an inlet chamber for steam, an inlet chamber for water, a mixing chamber for mixing steam and water, an outlet connected to the mixing chamber, a permanently open fluid connection between the water inlet chamber and the mixing chamber, and valve means responsive to water flow for controlling steam flow from the steam inlet chamber to the mixing chamber.

Preferably the valve means comprises a poppet valve arranged in the steam inlet chamber and coupled to a diaphragm responsive to pressure differentials arising in the water inlet chamber and a control chamber for moving the poppet valve relative to a valve seating.

Conveniently the water inlet chamber and control chamber are connected to a water inlet on the downstream and upstream sides respectively of a flow restrictor. By this arrangement the pressure in the water inlet chamber is reduced relative to the pressure in the control chamber with water flow and such pressure differential increases with increasing flow.

The flow restrictor preferably comprises an adjustable restrictor valve. In this way the pressure drop can be pre-set for a given water flow to control opening of the poppet valve to obtain the desired final water temperature.

Advantageously the diaphragm is arranged for response to an increase in the pressure differential to act in a direction to open the poppet valve relative to the valve seating and for a response to a reduction in the pressure differential to close the poppet valve relative to the valve seating. In this way the poppet valve is closed to shut off the steam flow when there is no water flow.

Preferably a spring within the steam inlet chamber acts on the poppet valve in a direction to close the poppet valve relative to the valve seating. As a result, the poppet valve is opened relative to the valve seating when the pressure differential across the diaphragm overcomes the resilient biassing of the spring and is closed when the resilient biassing overcomes the pressure differential across the diaphragm. In this way it is ensured that the steam flow only occurs when there is sufficient water flow.

The valve seating preferably opens to a diffuser within the mixing chamber for dispersing the steam flow into the mixing chamber.

Preferably the diffuser has a plurality of ports for passage of the steam flow into the mixing chamber and the mixing chamber is constructed to direct the water flow past the ports. In this way rapid and smooth blending of the steam flow and water flow is obtained.

Advantageously means is provided for controlling the final water temperature. Conveniently such means comprises a stop for limiting opening of the poppet valve relative to the valve seating.

Preferably the stop is adjustable and comprises a spindle arranged in the steam inlet chamber and adjustable towards and away from the poppet valve by means of a manually operable control handle.

Preferably the valve comprises a body having an internal partition separating the inlet chambers and defining the mixing chamber.

Conveniently the poppet valve seating is mounted in the partition and the permanently open fluid connection between the cold water inlet chamber and the mixing chamber is provided by a plurality of ports in the partition.

An exemplary embodiment of the invention will now be described in more detail with reference to the accompanying drawings.

DETAILED DESCRIPTION OF THE EXEMPLARY EMBODIMENT

Figure 1:
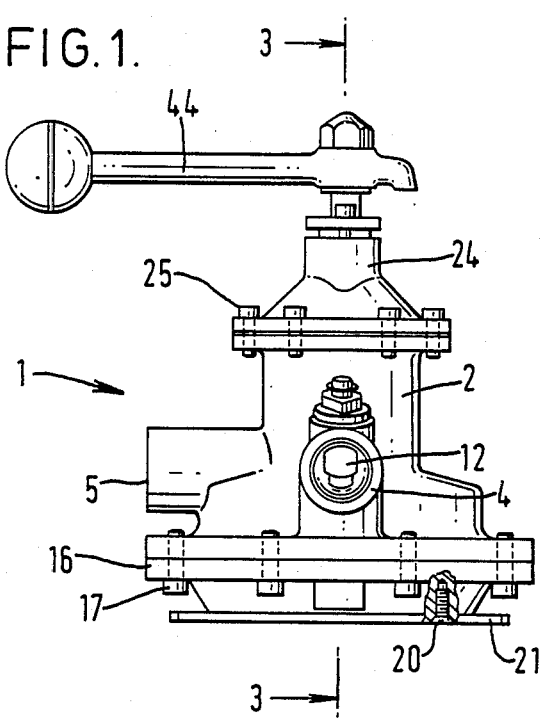
FIG. 1 is a side view of a mixing valve according to the present invention.
Figure 2:
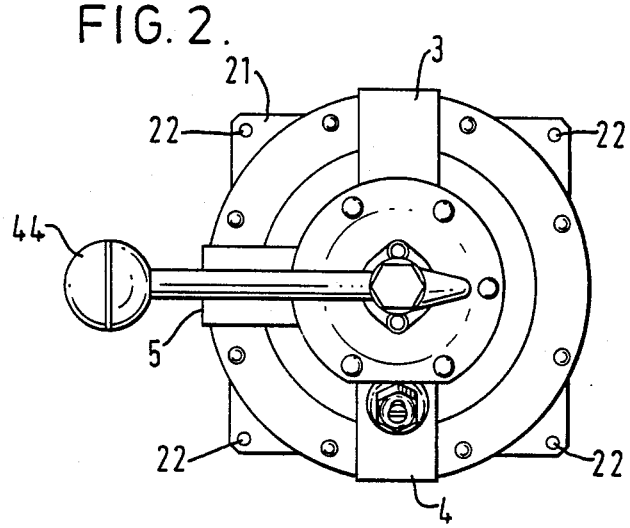
FIG. 2 is a plan view of the mixing valve shown in FIG. 1.

Referring to the accompanying drawings, a mixing valve 1 is shown comprising a body 2 having separate inlets 3,4 for respective connection to a steam supply (not shown) and a cold water supply (not shown) and an outlet 5 for connection to a flow control valve such as a hose gun (not shown) for controlling starting and stopping of the water flow.

The body 2 has an internal partition 6 separating respective inlet chambers 7,8 for the steam and cold water. The partition 6 defines a mixing chamber 9 opening to the outlet 5 and connected to the cold water inlet chamber 8 through a plurality of ports 10. The ports 10 provide a permanently open connection between the inlet chamber 8 and mixing chamber 9 through which water can flow at all times.

The cold water inlet chamber 8 is connected to cold water inlet 4 by a port 11 in the body 2 through which the flow rate is controlled by an adjustable flow restrictor valve 12 mounted in the inlet 4. The inlet chamber 8 is defined in part by a rolling edge diaphragm 13 supported at the centre on each side by respective metal plates 14,15 and sealed to the body 2 by a base plate 16 secured to the body 2 by threaded fasteners 17. The diaphragm 13 is made of steam resistant fabric reinforced rubber.

The base plate 16 provides a control chamber 18 communicating with the old water inlet 4 through a passageway 19 opening into the inlet 4 upstream of the flow restrictor valve 12.

Attached to the base plate 16 by screws 20 is a square mounting plate 21 having a hole 22 at each corner for mounting the valve 1 by means of threaded fasteners (not shown).

The steam inlet chamber 7 is connected to the steam inlet 3 by a passageway 23 in the body 2 and is defined in part by a bonnet 24 secured to the body 2 by threaded fasteners 25.

Flow of steam from the inlet chamber 7 to the mixing chamber 9 is controlled by a poppet valve 26 arranged in the inlet chamber 7 for axial movement relative to a valve seating member 27. The poppet valve 26 has a metal body 28 to which a PTFE face seating ring 29 is secured by a metal plug 30 pressed into the body 28.

The seating member 27 is made of stainless steel and opens to a diffuser 31 mounted within the mixing chamber 9. The diffuser 31 is provided with a plurality of radial ports 32 opening into the mixing chamber 9 opposite an intermediate wall 33 within the mixing chamber 9 which directs the cold water flow from the inlet chamber 8 past the ports 32.

The poppet valve 26 is coupled to the diaphragm 13 by a push rod 34 arranged for axial sliding movement through guide supports 35 in the seating member 27, a central bore 36 in the diffuser 31 and a guide hole 37 in the partition 6.

Figure 3:
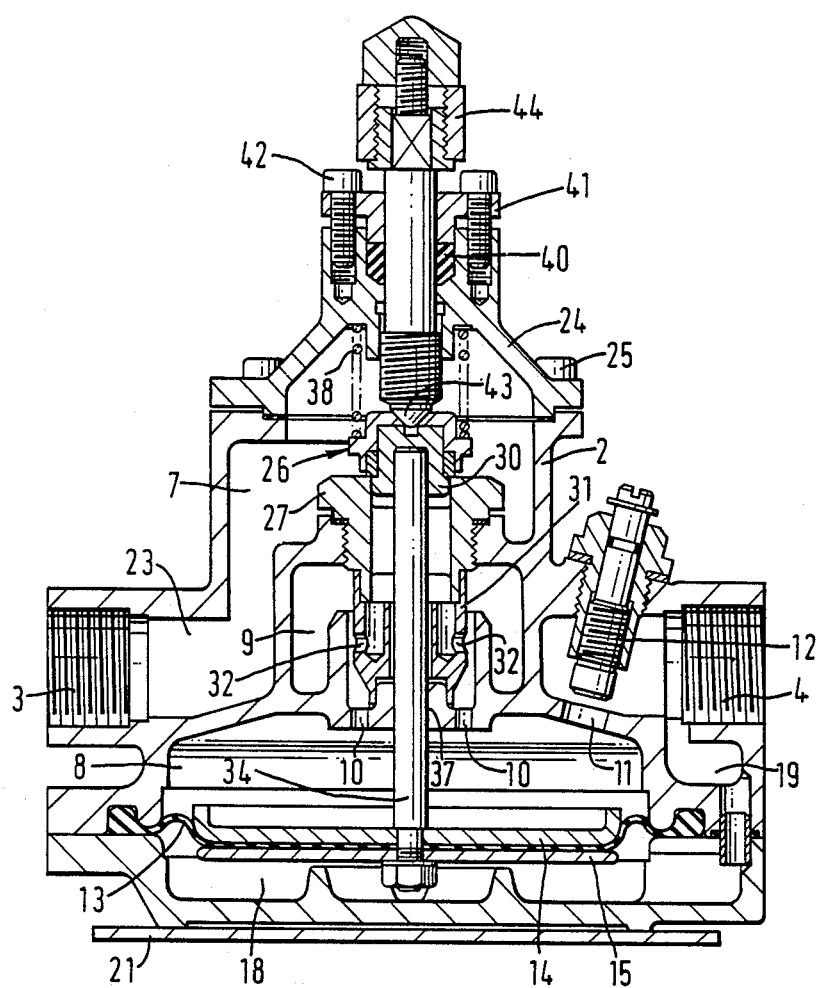
FIG. 3 is a section, to an enlarged scale, on the line 3—3 of FIG. 1 showing the steam valve closed.
Figure 4:
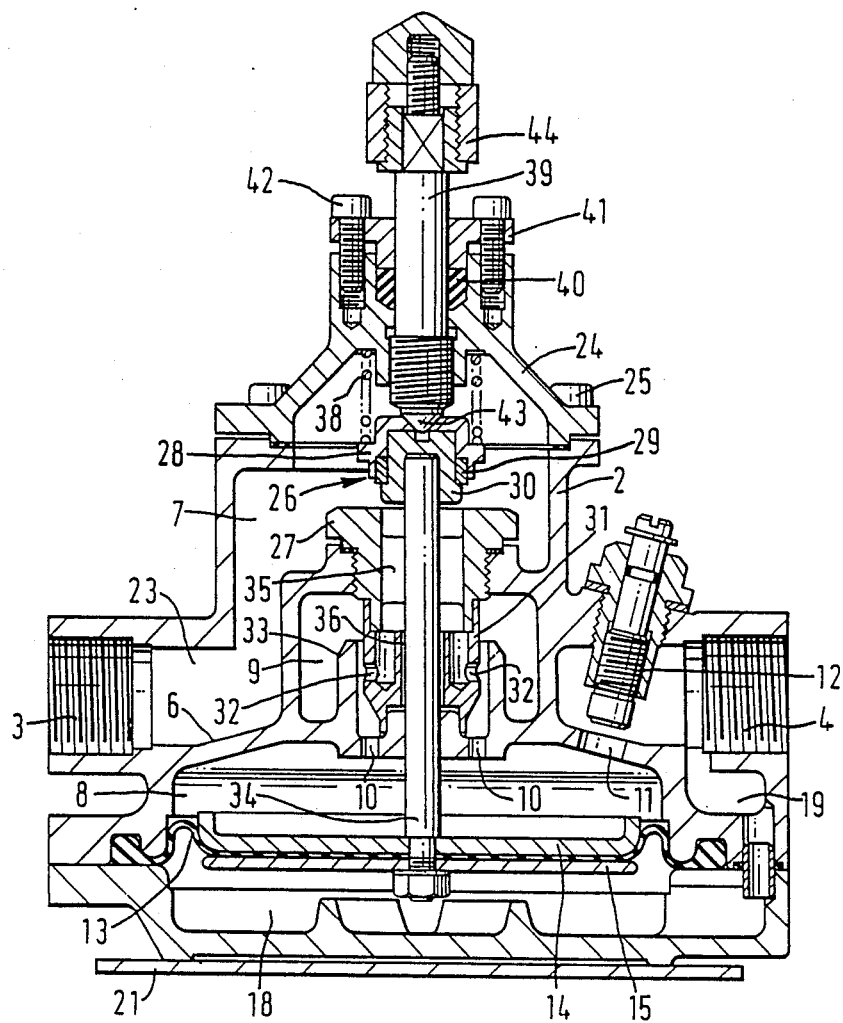
FIG. 4 is a section, similar to FIG. 3, showing the steam valve open.

The diaphragm 13 is subjected on opposed sides to the water pressures in the inlet chamber 8 and the control chamber 18. When there is no water flow, these pressures are balanced and the poppet valve 26 engages the seating member 27 under the biassing of a return spring 38 assisted by the hydrostatic steam pressure in the inlet chamber 7 to shut-off the steam flow as shown in FIG. 3.

When there is water flow, a pressure drop occurs across the flow restrictor valve 12 and the upstream and downstream pressures are transmitted to the control chamber 18 and the inlet chamber 8 giving rise to a pressure differential across the diaphragm 13. The differential pressure increases with increase in the flow and generates a force which urges the diaphragm 13 and push rod 34 in a direction to open the poppet valve 26 against the biassing of the spring 38 allowing the steam to flow and mix with the cold water which is thereby heated.

By directing the cold water flow past the steam ports 32, the steam is blended smoothly with the cold water and the volume of the mixing chamber 9 can be kept small. As a result the valve 1 operates quietly without any noticeable succession of steam implosions.

For controlling the final water temperature, the bonnet 24 mounts a temperature control spindle 39 sealed by a gland 40 retained by a compression collar 41 secured to the bonnet 24 by threaded fasteners 42.

The inner end of the spindle 39 provides a stop 43 to limit opening movement of the poppet valve 26 and is axially adjustable between a first end position in which the poppet valve 26 is held closed and a second end position permitting maximum opening of the poppet valve 26 by a manually operable control handle 44 connected to the outer end.

The flow restrictor valve 12 is adjusted on initial installation of the valve 1 with the stop 43 in the second end position to set the maximum water temperature that can be obtained enabling the user to select any desired temperature up to the maximum by appropriate adjustment of the stop 43.

As will now be appreciated the present invention provides a valve for mixing steam with cold water in which valve means for controlling the steam flow is responsive to the cold water flow so as to shut-off the steam flow when the water flow is low or off. In this way the valve is flushed with cold water on stopping the flow thereby preventing a violent burst of steam being obtained when the flow is re-started.

Additionally, if the cold water supply fails the steam flow is immediately shut-off by the poppet valve thereby preventing escape of steam and/or back-flow into the cold water supply. Similarly the poppet valve prevents back-flow of cold water into the steam supply. As a result the invented valve can be fitted without non-return valves in the steam and cold water supplies although it is generally preferable to include such non-return valves as a precaution in the event of the poppet valve failing.

The valve may include a trim cover over the bonnet and body to prevent users touching the hot surfaces.

The flow control valve for starting and stopping water flow through the invented valve may be connected to the outlet as described or to the cold water inlet and may also include means for adjusting the flow.

The valve seating member may be integral with the diffuser, for example the valve seating member and diffuser may comprise a one piece stainless steel casting.

The valve face seating ring may comprise polyetheretherketone (PEEK) or any other suitable material in place of polytetrafluoroethylene (PTFE).

The push rod connecting the diaphragm and valve member may be located against rotation, for example the guide hole in the partition may be of square of other non-circular cross-section in which a portion of the push rod of complementary cross-section is slidably received.

A lockshield cover may be provided to prevent accidental or unauthorised adjustment of the set position of the flow restrictor valve.

The control handle may be detachable and the compression collar provided with a lockshield to prevent accidental or unauthorised adjustment of the set position of the temperature control spindle.

The grip portion of the control handle may be extended to facilitate handling.

I claim:

1. A mixing valve for mixing steam and water comprises an inlet chamber for steam, an inlet chamber for water, a mixing chamber for mixing steam and water, an outlet connected to said mixing chamber, a permanently open fluid connection between said water inlet chamber and said mixing chamber, valve means responsive to water flow for controlling steam flow from said steam inlet chamber to said mixing chamber, said valve means comprising a valve member arranged in said steam inlet chamber and coupled to a diaphragm responsive to pressure differentials arising in said water inlet chamber and a control chamber for moving said valve member relative to a valve seating, and means for controlling the temperature of said mixed steam and water, said temperature control means comprising a stop to limit opening of said valve means.

2. A mixing valve according to claim 1 wherein said water inlet chamber and control chamber are connected to a water inlet on the downstream and upstream sides respectively of a flow restrictor.

3. A mixing valve according to claim 2 wherein said flow restrictor comprises an adjustable restrictor valve.

4. A mixing valve according to claim 1 wherein said diaphragm is arranged for response to an increase in the pressure differential to act in a direction to open said valve means and for a response to a reduction in the pressure differential to close said valve means.

5. A mixing valve according to claim 1 wherein said valve member is resiliently biassed towards said valve seating.

6. A mixing valve according to claim 1 wherein said valve member comprises a poppet valve.

7. A mixing valve according to claim 1 wherein said valve seating opens to a diffuser within said mixing chamber.

8. A mixing valve according to claim 7 wherein said diffuser has a plurality of radial ports opening into said mixing chamber.

9. A mixing valve according to claim 8 wherein said mixing chamber has a wall opposite said radial ports for directing said water flow past said ports.

10. A mixing valve according to claim 1 wherein said stop is adjustable.

11. A mixing valve according to claim 10 wherein said stop is adjustable towards and away from said valve member by means of a manually operable control handle.

12. A mixing valve according to claim 1 wherein an internal partition separates said inlet chambers and defines said mixing chamber.

13. A mixing chamber according to claim 12 wherein said partition includes said valve seating and said permanently open fluid connection between said water inlet chamber and said mixing chamber is provided by at least one port in said partition.

14. A mixing valve according to claim 1 wherein said diaphragm comprises a rolling edge diaphragm.

15. A mixing valve according to claim 14 wherein said diaphragm is supported at the centre by at least one reinforcing plate to which said valve member is connected by a push rod.

16. A mixing valve for mixing steam and water comprises an inlet chamber for steam, an inlet chamber for water, an internal partition separating said inlet chamber and defining a mixing chamber for mixing steam and water, a permanently open fluid connection provided between said water inlet chamber and said mixing chamber by at least one port in said partition, valve means responsive to water flow for controlling steam flow from said steam inlet chamber to said mixing chamber, said valve means comprising a valve member arranged in said steam inlet chamber and coupled to a diaphragm responsive to pressure differentials arising in said water inlet chamber and a control chamber for moving said valve member relative to a valve seating in said partition, and an outlet connected to said mixing chamber.

17. A mixing valve according to claim 16 wherein said mixing chamber has first and second axially spaced end walls defined by said partition and said valve seating is defined by a seating member mounted in said first end wall and opening to a diffuser positioned within said mixing chamber.

18. A mixing valve according to claim 17 wherein said diffuser is surrounded by an intermediate wall extending axially from said second end wall within said mixing chamber and is provided with a plurality of radial ports opening into said mixing chamber opposite said intermediate wall.

19. A mixing valve according to claim 18 wherein said permanently open fluid connection is provided by a plurality of axial ports in said second end wall, said ports opening into said mixing chamber between said intermediate wall and said diffuser.

20. A mixing valve according to claim 19 wherein said valve member is connected to said diaphragm by a push rod arranged for axial sliding movement relative to said seating member and is biassed towards said seating member for engagement with said valve seating to close said valve means, and a stop is provided for engagement by said valve member to limit opening of said valve means.

* * * * *